United States Patent [19]
Asthana et al.

[11] Patent Number: 5,740,384
[45] Date of Patent: Apr. 14, 1998

[54] INTERACTIVE MULTIMEDIA SYSTEM USING ACTIVE BACKPLANE HAVING PROGRAMMABLE INTERFACE TO RECONFIGURE THE MEDIA STREAM PRODUCED BY EACH COMPONENT

[75] Inventors: Abhaya Asthana, Berkeley Heights; Venkatesh Krishnaswamy, Highland Park, both of N.J.

[73] Assignee: Lucent Technologies Inc., Murray Hill, N.J.

[21] Appl. No.: 603,022

[22] Filed: Feb. 16, 1996

Related U.S. Application Data

[63] Continuation of Ser. No. 242,384, May 13, 1994, abandoned.

[51] Int. Cl.$^6$ .............................. G06F 13/36; G06F 13/00
[52] U.S. Cl. ....................... 395/306; 395/281; 395/881; 395/800.28; 395/200.73
[58] Field of Search ........................... 395/800, 822, 395/823, 853, 872, 882, 883, 884, 892, 893, 894, 281, 282, 310, 311, 682, 329, 330, 331, 333, 200.03, 200.09, 200.1, 200.12, 200.15, 200.01, 305–309, 200.31, 200.68, 200.73, 800.28; 348/13–17, 659; 370/85.1, 85.9, 230, 222, 387

[56] References Cited

U.S. PATENT DOCUMENTS

| | | | |
|---|---|---|---|
| 4,625,081 | 11/1986 | Lotito et al. | 379/88 |
| 5,170,252 | 12/1992 | Gear et al. | 348/659 |
| 5,339,413 | 8/1994 | Koval et al. | 395/650 |
| 5,339,415 | 8/1994 | Strout, II et al. | 395/650 |
| 5,371,736 | 12/1994 | Evan | 370/79 |
| 5,389,963 | 2/1995 | Lepley et al. | 348/7 |
| 5,434,592 | 7/1995 | Dinwiddie, Jr. et al. | 345/133 |
| 5,495,583 | 2/1996 | Townsend et al. | 395/282 |
| 5,499,361 | 3/1996 | Wilson et al. | 395/200.03 |
| 5,544,315 | 8/1996 | Lehfeldt et al. | 395/200.2 |
| 5,555,264 | 9/1996 | Gopta et al. | 370/397 |
| 5,594,725 | 1/1997 | Tischler et al. | 370/260 |
| 5,625,780 | 4/1997 | Hsieh et al. | 395/311 |

FOREIGN PATENT DOCUMENTS

WO-A-16558   8/1993   WIPO .................. H04N 7/18

OTHER PUBLICATIONS

G. Blakowski, J. Hubel, U. Langrehr, M. Muhlhauser, "Tool Support for the Synchronization and Presentation of Distributed Multimedia", *Multimedia*, vol. 15, No. 10, Dec. 1992.

C. Schmandt, B. Arons, "Phone Slave: A Graphical Telecommunications System", *SID 84 Digest*, 1984.

W. F. Leung, T. J. Baumgartner, Y. H. Hwang, M. J. Morgan, S–C. Tu, "A Software Architecture for Workstations Supporting Multimedia Conferencing in Packet Switching Networks", *IEEE Journal on Selected Areas in Communications*, vol. 8, No. 3, Apr. 1990.

D. C. Swinehart, "Telephone Management in the Etherphone System", *IEEE Globecom*, 1987.

R. S. Calnan, "Island: A Distributed Multimedia System", *IEEE Globecom*, 1987.

D. Hindus, C. Schmandt, "Ubiquitous Audio: Capturing Spontaneous Collaboration", *CSCW 92 Proceedings*, Nov. 1992.

(List continued on next page.)

*Primary Examiner*—Meng-Ai T. An

[57] ABSTRACT

A multimedia system includes a plurality of components. Each component has a set of hardware resources which are used to perform basic functions. Each component further contains knowledge regarding the properties, limitations and behavior of the resources. A backplane receives each of the components. The backplane includes a plurality of programmable interfaces. Each interface interfaces with a different component. A control thread is associated with each component which manages the resources contained in the component. The combination of the backplane, control thread and component form a basic service which operates independently from other basic services created by the system.

31 Claims, 4 Drawing Sheets

OTHER PUBLICATIONS

P. Resnick, "Hypervoice a Phone–Based CSCW Platform", *CSCW 92 Proceedings*, Nov. 1992.

C. Schmandt, M. A. McKenna, "An Audio and Telephone Server for Multi–Media Workstations", *Proceedings, Second IEEE Conference on Computer Workstations, IEEE,* Santa Clara, CA 1988.

A. Hopper, "Improving Communications at the Desktop", *Computer Networks and ISDN Systems,* vol. 26, No. 10, Jul. 1994.

W. Lee, Y. Kim, R. J. Gove, C. J. Read, "MediaStation 5000: Integrating Video and Audio", *IEEE MultiMedia,* 1994.

INTERACTIVE MULTIMEDIA SYSTEM USING ACTIVE BACKPLANE HAVING PROGRAMMABLE INTERFACE TO RECONFIGURE THE MEDIA STREAM PRODUCED BY EACH COMPONENT

This application is a continuation of application Ser. No. 08/242,384, filed on May 13, 1994 now abandoned.

BACKGROUND OF THE INVENTION

The present invention is directed to a system for providing interactive multimedia services.

The desire for multimedia services which allow users to interact with one another in real time has instigated the integration of various known devices such as computers, telephones, and televisions. Computer systems, in particular, play an integral part in bringing together various media streams which include audio, video and text streams. Conventional computer systems are comprised of printed circuit (PC) boards which house a central processing unit (CPU). The CPU comprises an arithmetic logic unit (ALU), a control section and memory. The memory is connected to the ALU and control section by a bus. The control section controls the memory by placing signals on the bus to the memory. The bus comprises a set of wires which are mounted to the PC boards using connectors. The connectors, bus wires and associated support make up a passive backplane to which input/output (I/O) devices may be attached via an interface board. Applications are created by transmitting communication signals between the CPU and each of the I/O devices.

The CPU is responsible for the system's overall operation and for controlling the operation of the other components in the system. Each of the components is connected to the CPU over a single bus. As such, the bus is used for transferring data to and from the CPU to memory, and to and from the CPU to an I/O device or any other component connected to the bus. The CPU is also responsible for directing all of the traffic on the bus. For example, if a transfer of data is made from an I/O device to the memory, the CPU under program control will read each piece of data into its general registers and store each piece of data in memory.

Multimedia systems have been developed which incorporate hardware peripherals with conventional computer systems to provide the computer system with multimedia capability. For example, computers and telephones have been merged together by packaging both in the same physical housing and providing connections for computer mediated control of the telephone signalling. Similarly, video capabilities have been incorporated into computer systems by adding peripheral hardware and connections that allow video signals to be displayed on a computer monitor. While these approaches allow for simple services, more complex services are not possible because the video, audio and text data streams from each of the various sources cannot be combined at a fine grain level.

Because each application created for the computer system is managed and controlled by the CPU, the speed and the throughput of each application is limited by the processing power of the CPU and the time spent transferring information to and from the CPU. As such, the performance and operation of hardware peripherals connected to the CPU are limited by their interactions with the CPU since the peripherals must first interact with the CPU before they can communicate with each other. In addition, these systems cannot accommodate in-band processing. As such, the video and audio streams cannot be processed on the fly, thereby preventing the ability to provide real time interactive or collaborative services.

SUMMARY OF THE INVENTION

In accordance with the present invention, a multimedia system has been realized which combines a plurality of autonomous, intelligent components via an active backplane so as to enable the creation of multimedia information and services. The system enables real-time interaction between sources of multimedia information and services both from within the system and from other similar systems.

The multimedia system creates services by combining different components in the system which each perform a basic function. Each such component is autonomous and intelligent in that it has its own logically independent thread of execution and is fully capable of managing the resources that it encapsulates. Audio, text and video streams produced by the components can be processed independently and variously combined. Embedded within each of the components is semantic knowledge which indicates the properties, behavior and limitations of each component. The active backplane comprises a plurality of programmable interfaces in the form of active buffers to which the components are connected and which further interact with the semantic knowledge contained in the components to provide the underlying facility for creating services. Services are created by combining the functionalities of selected basic components and by specifying and controlling their interactions.

DETAILED DESCRIPTION

Figure 1:
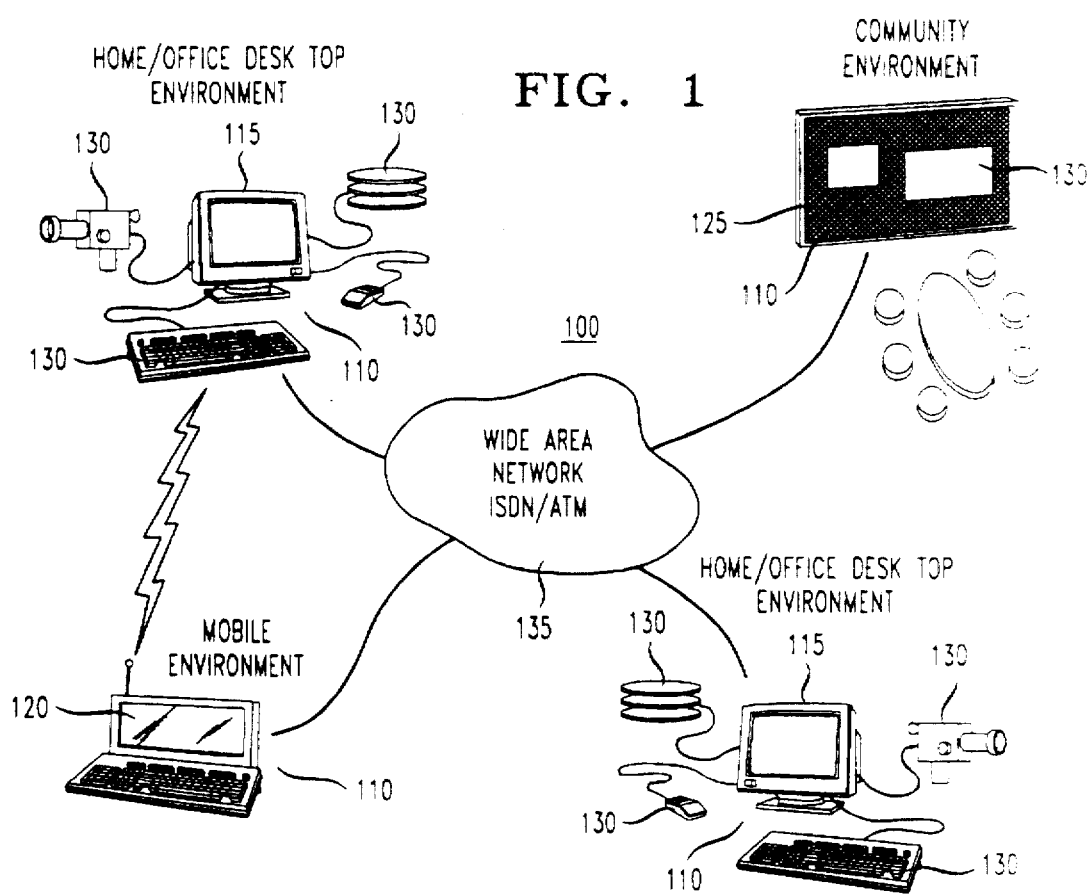
FIG. 1 is an architecture for a computer network of multimedia systems in accordance with the present invention.

FIG. 1 illustrates a network 100 comprised of various alternative embodiments of multimedia systems 110 which incorporate the principles of the present invention. The multimedia systems 110 are designed to be suitable for use in different types of environments, including desk top environments 115, mobile environments 120, and community environments 125, such as conference rooms. Each multimedia system 110 is comprised of basic components 130, such as, but not limited to, displays, keyboards, processors and network interfaces, each of which contains the intelligence required to manage the resources that it encapsulates. As such, each component can operate independently of other components and can interact with other components independent from the CPU.

The multimedia systems 110 are interconnected by a wide area network (WAN) 135. The WAN 135 is preferably designed to operate with existing and emerging protocol standards, such as asynchronous transfer mode (ATM) protocol, integrated services digital networks (ISDN) protocol and broadband ISDN (B-ISDN) protocol.

Figure 2:
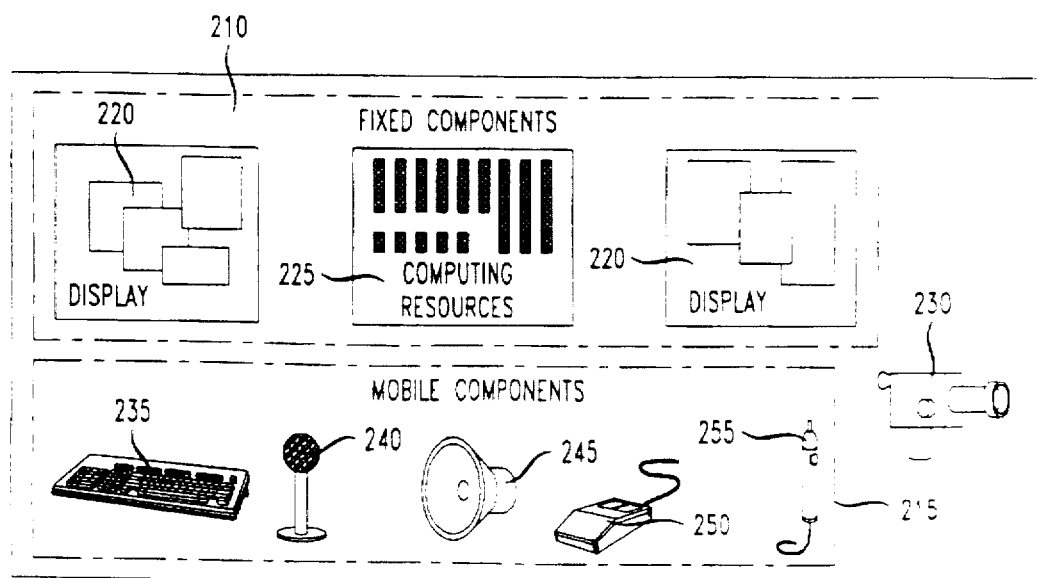
FIG. 2 is a front perspective view of one embodiment of the multimedia system of FIG. 1.

FIG. 2 illustrates a conceptual view of an embodiment of the multimedia system 110 of FIG. 1. The multimedia system 110 may include one or more subsystems which are designed to accommodate a particular user's needs relative to factors such as, but not limited to, mobility and the provision of particular services. For example, the multimedia system 110 may include stationary subsystems 210 and mobile subsystems 215 such that a user may transport a part of the system which includes the user's physical and logical environments. The stationary subsystem 210 may include a desktop configuration or may be wall mounted. Stationary subsystem 210 includes at least one display 220. Computing resources 225 such as disk drives, processing units and memory are also contained in stationary subsystem 210. A video camera 230 may be connected to the system to allow for video conferencing between multiple users.

The mobile subsystem 215 contains those basic components which are needed to run desired services or applications from a remote environment. The mobile subsystem 215 may include components such as, but not limited to, a keyboard 235, microphone 240, speaker 245 and mouse 250. Software services, such as, but not limited to, logical operators are provided by the active backplane and used to integrate the information streams provided by the various components used to create a given service. Logical operators (not shown) contained within the computing resources 255 which may include mixers, splitters, transformers, bridges, filters, selectors and taps are used to integrate the components to create desired services which may be applied to any media, e.g., voice, video or character streams. Each of the subsystems may be scaled to include additional hardware peripherals, processing capability or memory which may be required by the user in the future.

Figure 3:
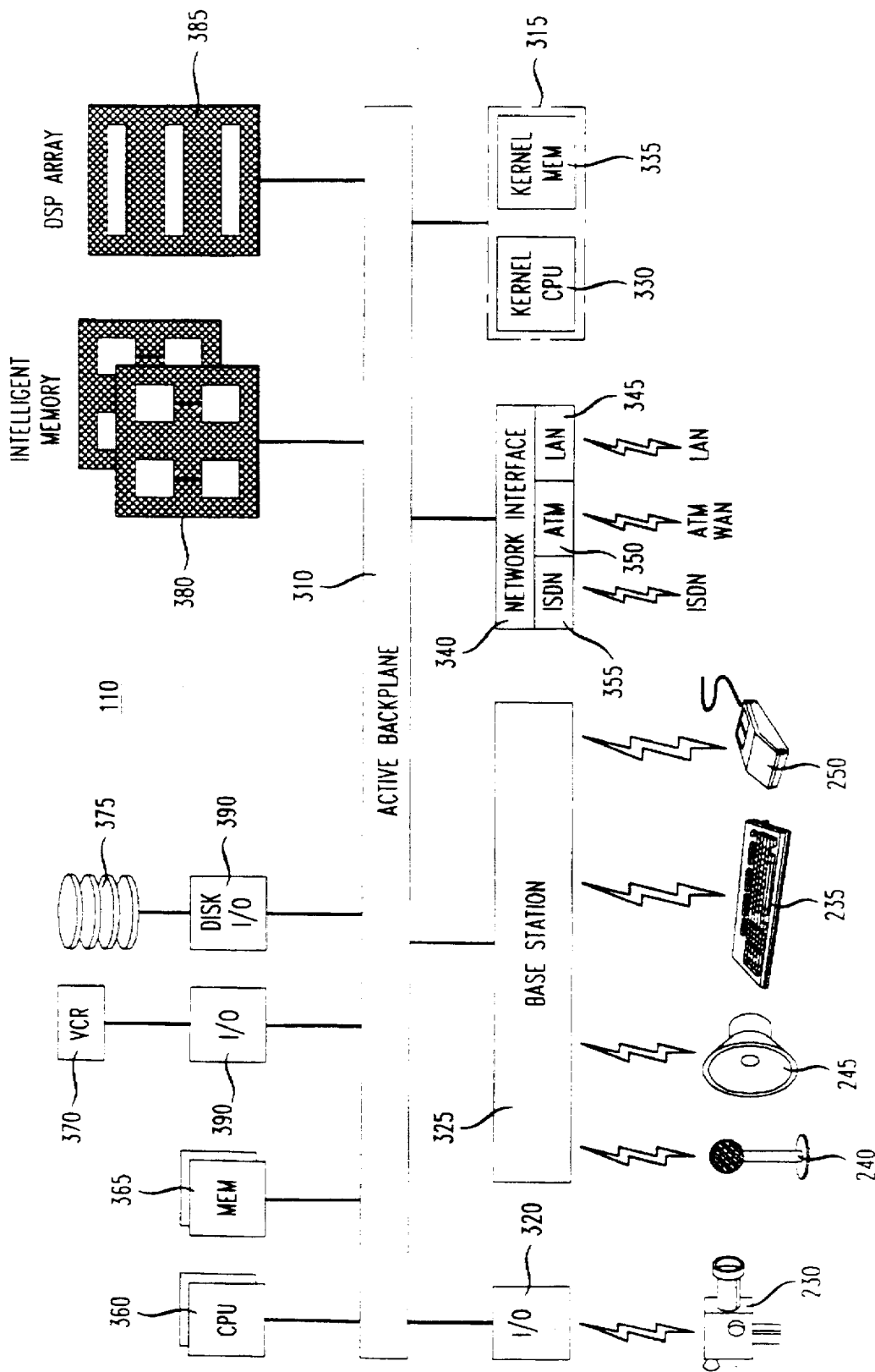
FIG. 3 is a block diagram of an architecture for the multimedia system of FIG. 1.

FIG. 3 illustrates a block diagram of an architecture for the multimedia system 110. Each system is comprised of a plurality of autonomous, intelligent components which are interconnected by a high-speed, high bandwidth desk area network (DAN) which is incorporated into an active backplane 310 and a kernel 315. The kernel 315 further comprises a kernel central processing unit (CPU) 330 and kernel memory 335. DAN is capable of carrying both packet-type data and real-time stream-oriented data and is the principle means for carrying data communications between the components of the system. Each of the components comprising the system 110 are plugged into the active backplane 310. As shown in FIG. 2, these components may include a camera 230 which is plugged into the active backplane 310 via an input/output (I/O) port 320 and microphone 240, speaker 245, keyboard 235 and mouse 250 which plug into a base station 325. Each of the components encapsulate a set of capabilities which are managed by a control thread. The control thread exists as a logically independent thread of execution thus allowing the component to function independent of other such components in the system. As such, components can be combined and recombined with other components to create services which may be accessed by a user of the system.

The control thread for each component performs the following functions: it provides a control interface to the component, it manages the resources contained within the component and it defines the operational semanitics of the component. As such, it has complete knowledge of the functioning, I/O capabilities, executions requirements and limitations of the component. The component together with its control thread form a basic service. The control thread may execute either within the component itself or within the active backplane.

The control interface of a basic service provides a well-defined means for other threads of execution, also referred to as clients, to interact with it. Through access functions provided in the control interface, these clients may request the basic service to perform certain actions. These actions, which may be performed by hardware resources encapsulated within, are coordinated by the control thread. For example, a speaker basic service may comprise of a speaker element, buffers and an analog-to-digital converter which are all managed by the control thread. Essential to such management is the knowledge of the properties and limitations of the component resources such as the functional capacity, the number of I/O ports available, I/O formats and so on. A basic service may respond to multiple clients at the same time. The control thread uses the knowledge of the properties and limitations of the component's resources to mediate and multiplex their use among multiple simultaneous clients.

One or more basic services may be combined within a more complex service known as an aggregate service. An aggregate service has its own control thread which coordinates the invocation of the basic services that it comprises. Since a basic service can have multiple simultaneous clients, it may function within the context of multiple aggregate services at the same time.

The active backplane 310 also includes a network interface 340 which provides support for interconnectivity with a local area network (LAN) 345, ATM 350 and ISDN 355. Other basic components required for providing services such as, but not limited to, a central processing unit (CPU) 360, memory 365, video cassette recorder (VCR) 370, one or more disks 375, active memory 380 and digital signal processing (DSP) arrays 385 may also be plugged into the active backplane 310 either via an interface (FIG. 4) or via an I/O port 390.

Figure 4:
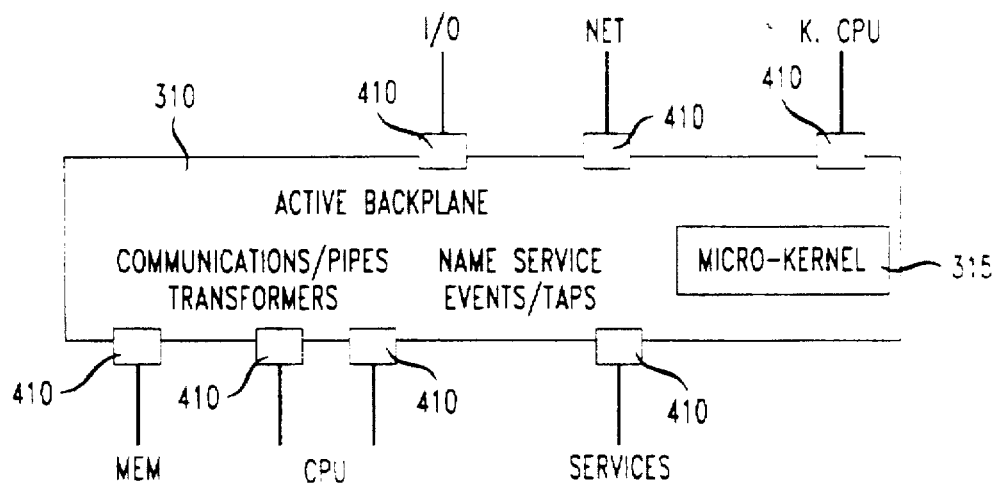
FIG. 4 is a block diagram of an architecture for the active backplane of FIG. 3.

Referring to FIG. 4, each interface 410 is programmable which allows the active backplane 310 to control the logical data and control channels so that the components can interact to provide a particular service. The software infrastructure for multimedia system 110 is based on the set of basic, autonomous components which interact with each other to provide services. The interactions between components are coordinated by kernel 315 in a manner which will be described in detail hereinafter.

The control logic contained in active backplane 310 for sequencing data transfers across the interfaces is reconfigurable so as to accommodate minor variations in the low level signalling protocol. The active backplane extends this physical level interface and the internal interconnection network to the logical data structure of an "active buffer". Components communicate via active buffers. The active buffers control the flow of data between each of the components within the system. Active buffers are used to transmit data between the components and may further be responsible for performing certain processes or transformations to the data prior to transmitting the data to another component. The input/output ports of each active buffer are typed. The types may be specified at the time of creation and may be altered during usage. The number of input/output ports for an active buffer can also be altered during execution. The active buffer allows for components to customize the parameters of their communications with respect to the media and/or data types, data rates, synchronization requirements, connection topology and some media processing and/or transformation requirements. This allows for the creation of communication interfaces between components which accurately match the semantics of the application or service that is utilizing these components.

A simple example of an active buffer would be a FIFO that takes a character stream as input and outputs the same character stream at a destination interface. In this case, the backplane simply provides the buffering and the rate control for matching the speeds between the sender and the receiver. Adding a "transformer" would allow data conversion in addition to the simple FIFO operation. A slightly more sophisticated active buffer would be a "splitter" that can accept a "composite" stream as input (audio, text, video) and split the output into three typed streams: text, audio and video. Many other operators of this type are possible using the basic active buffer data structure. The active backplane provides the data and control paths to efficiently implement this data structure.

Figure 7:
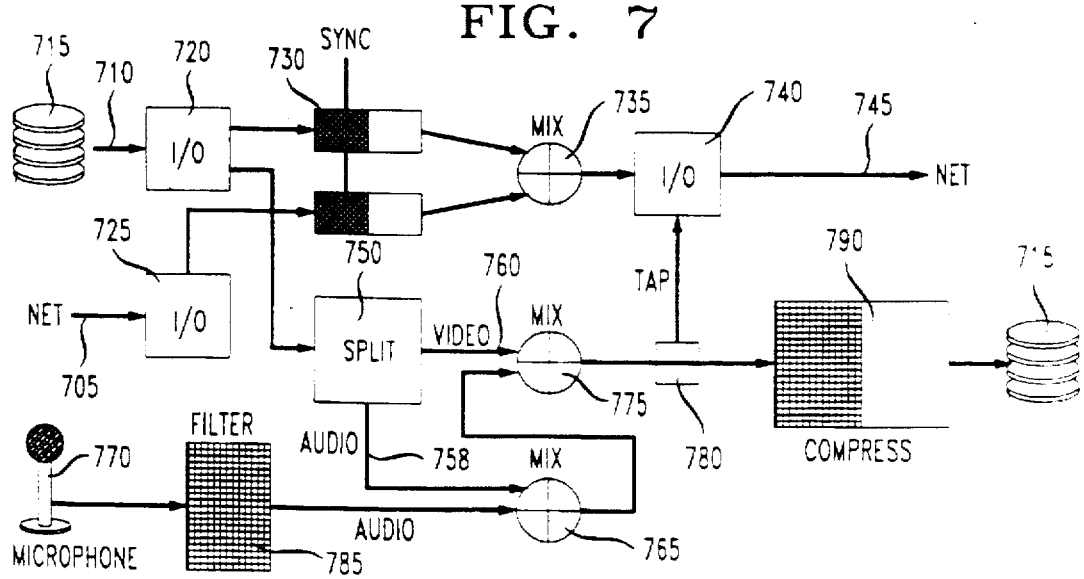
FIG. 7 illustrates a block diagram of a pipelined process which may be performed by the system of FIG. 3.

The control logic of active backplane 310 also allows for pipelined processing of multimedia applications of the type such as are illustrated in FIG. 7. As shown, an incoming video stream transmitted on line 705 over a network is synchronized with a second video stream being read on line 710 from a disk 715 by synchronizer 730. The two streams are mixed in a predetermined manner by mixer 735. The mixed streams are then sent to an I/O port 740 which transmits the mixed streams over the network on line 745.

Concurrently, stream 710 being read from disk 715 is split by splitter 750 into its audio and video streams on lines 755 and 760 respectively. The audio stream is mixed by mixer 765 with a second audio stream which is generated by microphone 770. The combined audio stream is then mixed by mixer 775 with the split video stream and compressed. The compressed stream is stored on disk 715. A tap 780 is inserted on the mixed video stream produced by mixer 775 which monitors the stream and transmits certain identified information of interest to I/O port 740 which transmits the information over the network. By pipelining the media streams in this manner, the streams are transmitted only to the applications which require them which minimizes the number of copies of the streams needed to implement the application. Pipelining the streams also allows for concurrent operation of applications by reducing delays and allowing multiple applications to run simultaneously.

The software infrastructure is organized in a hierarchical manner such that more complex applications are derived from simpler applications. At the most basic level of the hierarchy are the components. Components include the basic elements of the system such as, but not limited to keyboards, microphones, speakers and displays as described above. The components are combined together to form basic services. For example, speaker basic services include an interface to the speaker component that allows the speaker to accept a connection to a microphone component. Another speaker basic service allows the speaker to provide volume adjustment.

The basic components and simple services can be combined to create aggregate services and sessions as will be described in detail hereinafter. As discussed above, the kernel 315 provides the framework for coordinating the activities of the various components and basic services needed to provide more complex services. The kernel 315 provides multi-threaded execution that allow multiple contexts to be active concurrently. For example, interaction between two or more autonomous services can proceed concurrently, with active backplane resources being allocated to facilitate each iteration. The kernel 315 also provides very fast context switching and event handling, high bandwidth capability and low latency communication between tasks which may be executing on various processors. The kernel 315 uses the DSP arrays 385 and active memory 380 as its resource for running various applications.

Aggregate services are formed by combining particular basic services. The basic services used to create the aggregate service are tied together by a control thread that coordinates the interactions between the basic services. The control thread contains the control and logic information needed to combine the services and provides the necessary infrastructure. Aggregate services can be invoked by a user of the system 110 or linked to other services using a well-defined interface to create more complex aggregate services.

Figure 5:
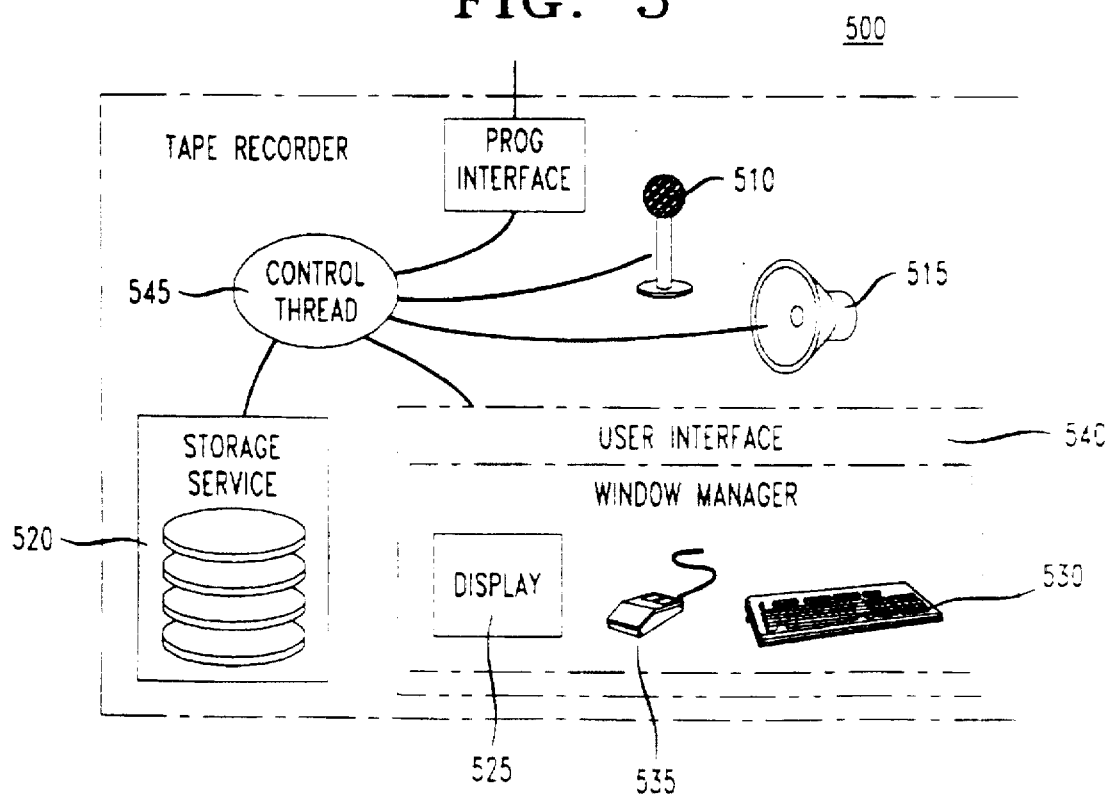
FIG. 5 illustrates a block diagram illustrating the aggregation of components of the multimedia system of FIG. 1 to create a particular service.

An example of an aggregate service is illustrated in FIG. 5. FIG. 5 shows the services used to create an electronic tape recorder 500 in accordance with the present invention. The tape recorder 500 is capable of recording and playing back audio messages. The tape recorder 500 includes a microphone basic service 510 for providing voice input, a speaker basic service 515 for providing voice output, a storage basic service, such as disk 520 for providing storage of audio signals, and a user interface 540 which may comprise a display basic service 525 and keyboard basic service 530 or mouse basic service 535 for providing control input and output. Control thread 545 sequences the invocation of the basic services and provides the processing logic required to implement the functionality of the tape recorder 500. Control thread 545 also implements an interface through which other services may access this functionality. For example, another service can directly access the electronic tape recorder 500 via the program interface.

An example of a function performed by the electronic tape recorder 500 is the recording of a message. After invoking the tape recorder 500, the user clicks the record button using an input device, such as, but not limited to, a mouse (not shown) in the window manager and speaks into the microphone to start the recording process. The control interface recognizes the event on the record button to commence the sampling of speech data from the microphone, performs the required speech processing and compression, and writes the data in a designated disk file in the storage service. The message can be played back by reading the speech data from the file in the storage service, processing the data and writing the data out to the speaker service for final audio output. Other operations, such as, pause, stop, rewind, and fast forward are similarly managed by the control thread.

The system 110 can also be used to create sessions. A session exists when two or more independent services interact with each other. A service can interact with another service by making a call to that service. Multi-party calls can be used to establish an interaction between two or more services. Each call establishes a set of connections or conduits for information transfer between the various services involved. A connection is characterized by the type of information it carries, such as, but not limited to, voice, video, or packet data, and the quality of service requested by the application. A session continues to exist as long as two or more services continue to participate in the session. As such, services may join and leave an active session without affecting the continuance of the session.

Figure 6:
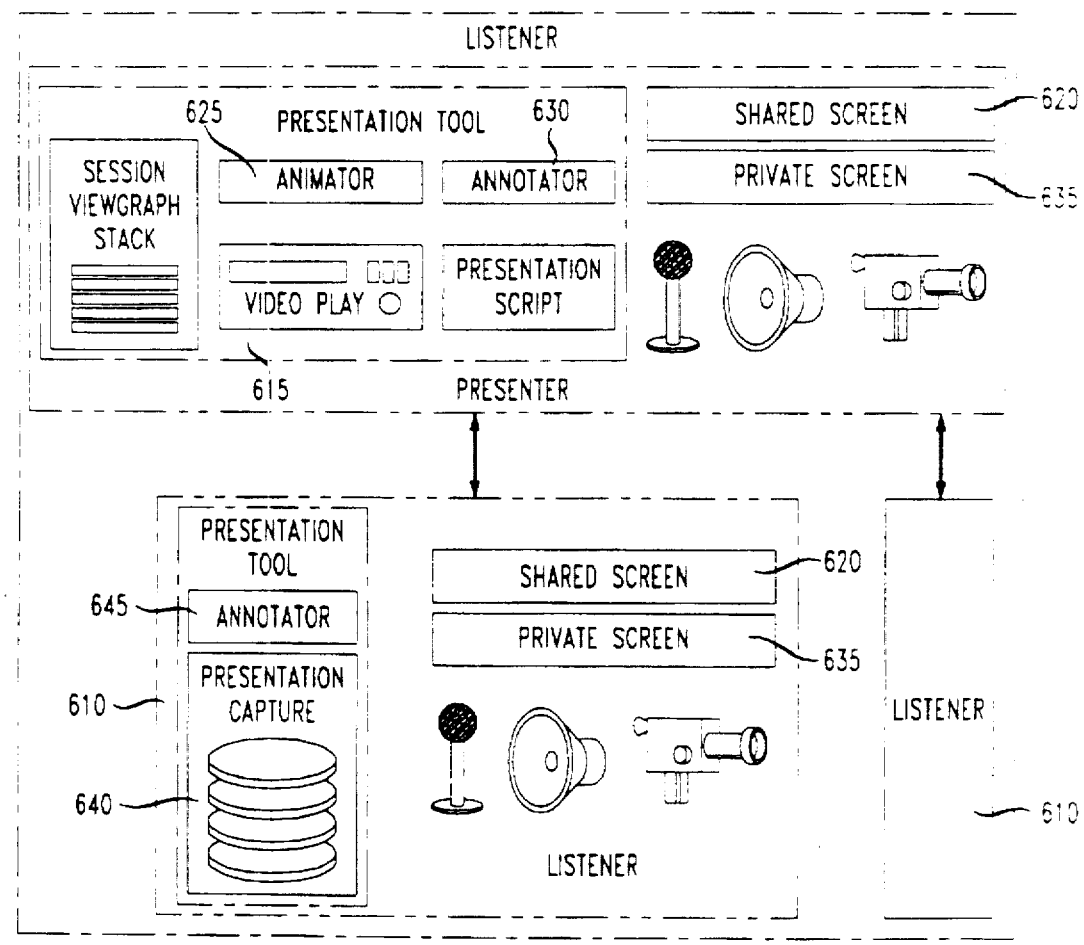
FIG. 6 illustrates a block diagram of a setup for a "virtual" presentation in accordance with the present invention.

An example of a session is illustrated in FIG. 6 which sets forth the setup required for conducting a "virtual" presentation. The session is comprised of a number of complex services which combine to provide the overall presentation. Each service handles a different presentation environment, i.e., video, voice, text and animation. A virtual presentation is a mechanism for allowing a user (presenter) of multimedia system 605 to present an electronic presentation to a remote audience comprised of users of multimedia systems 610 which are connected to the WAN. The presenter uses a presentation tool 615 to create a presentation which is transmitted over a shared screen 620 associated with each audience participant's system. The presentation tool 615 may be used to project viewgraphs or frames of text and/or graphics. An animation tool 625 can be used to create graphics for the viewgraphs. A video window (not shown) may also be associated with the presenter's system so that the image of the presenter can be viewed on the shared screen. A broadcast voice connection or annotator 630 carries the presenter's voice to each audience participant's system.

Each of the systems may also include a private screen 635 for taking notes. Each of the participants may capture the presentation on disk 640 for later retrieval and provide their own annotations using annotator 645. Each participant can further customize his or her personal environment to include services which are invisible to other audience participants. For example, a participant may include a notes service which allows him or her to annotate the viewgraphs he or she receives and transmit the annotated viewgraphs to a viewgraph capture tool which stores the annotated viewgraphs locally. Another option would be for the participant to convert the audio portion of the presentation to text by using a speech-to-text converter.

It will be appreciated that those skilled in the art will be able to devise numerous and various alternative arrangements which, although not explicitly shown or described herein, embody the principles of the invention and are within its scope and spirit.

We claim:

1. A system for integrating media streams to provide a variety of real-time services, the system comprising:
   a plurality of autonomous, intelligent components for performing basic functions, each component containing a set of predefined resources having a given set of properties within memory associated with the component, each component further having an independent execution thread associated therewith for managing the resources, said thread containing information representative of the functioning, input/output (I/O) capabilities, execution requirements and limitations of the component with which said thread is associated; and
   an active backplane including one or more programmable interfaces which receive each of the components, the interface and each of the components being combined to form a basic service for performing a particular operation which is operable independent from the other components, said basic service receiving process and control flow information from the active backplane, said basic service being autonomous, self managing and capable of directly initiating interactions with other services over said active backplane to implement at least a one of said real-time services wherein said backplane contains control logic capable of reconfiguring the media streams produced by each component.

2. The system according to claim 1 further comprising:
   means for combining and controlling interactions between selected components to create aggregate services; and
   means for composing logical threads from the execution threads associated with each selected component for determining a manner in which the selected components are combined and the operations performed by the components.

3. The system according to claim 2 further comprising means for integrating two or more logical threads representing two or more services within a more complex service.

4. The system according to claim 3 further comprising means for multiplexing components used in existing services in other services.

5. The system according to claim 1 wherein said components include input/output devices.

6. The system according to claim 1 wherein at least one of the components is a wireless component.

7. The system according to claim 1 further comprising means for manipulating the media streams.

8. The system according to claim 7 wherein said manipulating means includes means for splitting one or more streams.

9. The system according to claim 7 wherein said manipulating means includes means for dividing one or more streams into a plurality of streams.

10. The system according to claim 7 wherein said manipulating means includes means for combining a plurality of streams.

11. The system according to claim 1 wherein said components include hardware and software components.

12. The system according to claim 1 wherein said media streams include audio streams.

13. The system according to claim 12 wherein said media streams include video streams.

14. The system according to claim 13 wherein said media streams include text streams.

15. A multimedia system comprising:
   a plurality of components, each component comprising a set of hardware resources having a given set of properties used to perform basic functions, each component containing information representative of the set of properties, limitations and behavior of the resources within memory associated with the component;
   an active backplane for receiving each of said components, said backplane including a plurality of programmable interfaces, each interface interacting with a different one of said components; wherein said backplane contains control logic capable of reconfiguring media streams produced by each component;
   a control thread associated with each one of said plurality of components, said control thread managing the resources contained within each component, the active backplane, one of said components and its associated control thread being combined to form a basic service for performing a particular operation which operates independently from other basic services created by the multimedia system, said basic service receiving process and control flow information from the active backplane, said basic service being autonomous, self managing and capable of directly initiating interactions with other services over said active backplane to implement multimedia applications.

16. The system according to claim 15 wherein said components include input/output devices.

17. The system according to claim 16 wherein said control thread is executed in said associated component.

18. The system according to claim 16 wherein said control thread is executed in said backplane.

19. The system according to claim 16 further comprising:

means for combining and controlling interactions between two or more components selected from the plurality of components to create aggregate services; and means for composing logical threads from the control threads associated with at least two selected components, said logical threads determining which selected components are combined and which operations are to be performed by the selected components.

20. The system according to claim 19 wherein said combining means comprises one or more active buffers which control a flow of media streams between each of the components in the aggregate service.

21. The system according to claim 19 further comprising means for integrating two or more logical threads representing two or more services within a more complex service.

22. The system according to claim 21 further comprising means for multiplexing components used in existing services in other services.

23. The system according to claim 15 wherein at least one of the components is a wireless component.

24. The system according to claim 15 further comprising means for manipulating the media streams.

25. The system according to claim 24 wherein said manipulating means includes means for splitting one or more streams.

26. The system according to claim 24 wherein said manipulating means includes means for dividing one or more streams into a plurality of streams.

27. The system according to claim 24 wherein said manipulating means includes means for combining a plurality of streams.

28. The system according to claim 15 wherein said media streams include audio streams.

29. The system according to claim 28 wherein said media streams include video streams.

30. The system according to claim 29 wherein said media streams include text streams.

31. The system according to claim 30 wherein said audio, video and text media streams can be integrated.

* * * * *